United States Patent
Falke

[15] 3,697,102
[45] Oct. 10, 1972

[54] TUBING COUPLING
[72] Inventor: Jay F. Falke, P.O. Box C, Adrian, Mich. 49221
[22] Filed: Dec. 9, 1970
[21] Appl. No.: 96,411

Related U.S. Application Data

[63] Continuation-in-part of Ser. No. 27,706, April 13, 1970, abandoned, which is a continuation-in-part of Ser. No. 850,908, Aug. 18, 1969, abandoned.

[52] U.S. Cl. ..............................285/340, 285/382.7
[51] Int. Cl. .............................................F16l 19/08
[58] Field of Search...285/340, 212, 219, 337, 382.7; 277/235, 92

[56] References Cited

UNITED STATES PATENTS

| | | |
|---|---|---|
| 1,516,397 | 11/1924 | Mueller et al. ............285/340 |
| 3,404,905 | 10/1968 | Albrecht................285/340 X |
| 1,440,207 | 12/1922 | Burns ......................285/340 |
| 1,725,975 | 8/1929 | Bystricky..................285/340 |
| 3,164,890 | 1/1965 | Schmohl................285/340 X |
| 3,140,107 | 7/1964 | Hynes........................285/340 |

FOREIGN PATENTS OR APPLICATIONS

| | | |
|---|---|---|
| 1,560,094 | 2/1969 | France......................285/340 |
| 1,556,413 | 12/1968 | France......................285/340 |

*Primary Examiner*—Thomas F. Callaghan
*Attorney*—Barnes, Kisselle, Raisch & Choate

[57] ABSTRACT

A refrigeration tubing coupling for connecting deformable tubing to a refrigeration unit or to another length of refrigeration tubing. The coupling comprises two bodies having openings therein. A deformable crimping member is interposed between the bodies and cooperating surfaces between the bodies are adapted to deform the crimping member and cause it to in turn deform an annular portion of the tubing upon axial movement of the bodies toward one another.

4 Claims, 4 Drawing Figures

PATENTED OCT 10 1972 3,697,102

INVENTOR.
JAY F. FALKE
BY
Barnes, Kisselle, Raisch & Choate

TUBING COUPLING

This invention is a continuation-in-part of United States application Ser. No. 27,706, filed Apr. 13, 1970, and now abandoned, which in turn is a continuation-in-part of U.S. application Ser. No. 850,908, filed Aug. 18, 1969 and now abandoned.

This invention relates to tubing couplings for connecting tubing or conduits and particularly to a tubing coupling for connecting tubing and conduits to a refrigeration unit or to another refrigeration conduit.

BACKGROUND OF THE INVENTION

A tubing coupling for refrigeration must provide an effective seal even under vibration and other mechanical forces. Obviously a coupling which permits leakage would be entirely unsatisfactory since the loss of refrigerant would make the refrigeration system completely ineffective. This may be contrasted to a liquid or other type gaseous fitting which is used in connection with an inexhaustible supply of liquid or gas so that the system can continue to function even though there were very minute leakage. A further requirement in refrigeration systems is that there be a minimum consistently reproduceable deformation of the tubing. In the design of refrigeration systems, the amount of restriction of the tubing is taken into consideration and it is essential that the amount of restriction be kept at a minimum and in addition be reproduceable or consistent in different couplings so that the parameters of design can be properly ascertained.

Among the objects of the invention are to provide a new and simple inexpensive tubing coupling; which provides a positive seal both on the components and the tubing; which can be disconnected and recoupled; which has a positive alignment of the components; which is not subject to adverse effects by vibration; which forms a seal with a deformable length of tubing, which deformity is of predetermined size and shape, free of sharp indentations which would lead to a low fatigue life of the tubing; which does not require special preparation of the tubing; which provides for positive control both radially and longitudinally of the tubing position; which has minimum effect upon flow of refrigerant through the coupling and which utilizes metal-to-metal contact between components thereby minimizing blowouts due to temperature differential.

SUMMARY OF THE INVENTION

A refrigeration tubing coupling for connecting deformable tubing to a refrigeration unit or to another length of refrigeration tubing. The coupling comprises two bodies having openings therein. A deformable crimping member is interposed between the bodies and cooperating surfaces between the bodies are adapted to deform the crimping member and cause it to in turn deform an annular portion of the tubing upon axial movement of the bodies toward one another.

DESCRIPTION

Figure 1:
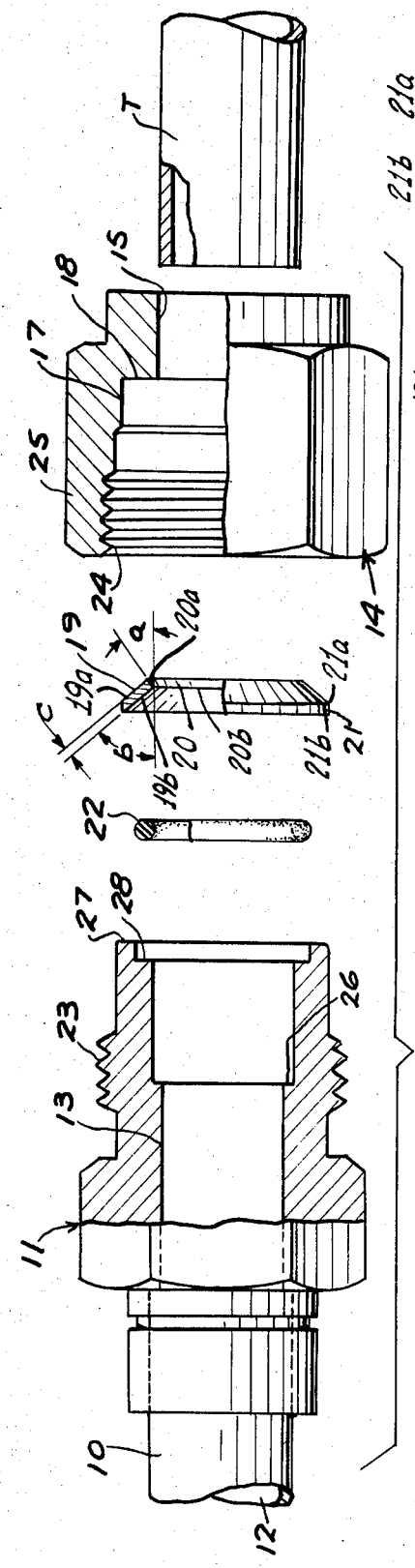
FIG. 1 is an exploded view of a tubing coupling embodying the invention.
Figure 2:
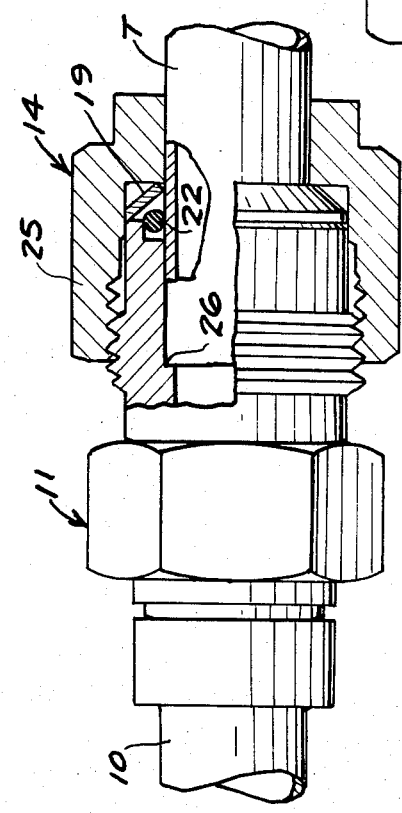
FIG. 2 is a longitudinal sectional view prior to complete attachment of the coupling.

Referring to FIGS. 1 and 2, a refrigerant unit such as a compressor or a length of tubing has a fitment or fitting body 11 thereon in fixed relation thereto. Unit 10 and fitment 11 have aligned openings 12, 13.

A fitment 14 forms a part of the coupling and prior to assembly comprises a body having an opening 15. The fitment 14 is also formed with a cylindrical axial surface 17 and a flat radial surface 18 at a right angle to the surface 17.

The coupling further includes a generally frusto-conical crimping member 19 which has substantially uniform cross-sectional thickness C between surfaces 19a, 19b. Crimping member 19 includes a flat outer peripheral surface 21 and a flat inner peripheral surface 20 which merge with the parallel surfaces to form corners 21a, 21b and 20a, 20b, respectively. Inner edge or surface 20 forms an angle a with the axis of the member 19 and outer edge or surface 21 is parallel to the axis of the body 14. The angle a which the inner surface 20 forms with the axis of the member 19 is preferably equal to the complement angle 6 which the body of the crimping member 19 forms with the axis thereof as shown in FIG. 1. The outer diameter of the crimping member 19 is preferably substantially equal to the inner diameter of the cylindrical surface 17. The inner diameter of the corner 20b of inner surface 20 of the crimping member 19 is substantially equal to the outer diameter of the tubing T.

Finally, the fitment includes an O-ring sealing gland 22 having an inner diameter slightly less than the outer diameter of the tubing T that is to be attached to complete the coupling. Tubing T may be made of any deformable material such as copper tubing, aluminum tubing or the like. The crimping member 19 is made of permanently deformable material such as steel and is preferably a steel stamping.

The outer periphery of the body 11 is formed with threads as at 23 which are adapted to cooperate with threads 24 on an axial annular portion 25 of body 14.

In order to assemble the coupling, the end of tubing T is inserted through opening 15 through crimping member 19 and the O-ring 22 is then placed over the end of the tubing. The free end of the tubing T is then moved into the opening 13 until it engages a shoulder 26 in the body 11 (FIG. 2). The body 14 is then rotated to interengage the threads.

Fitment 11 includes an outer generally radial peripheral surface 27 and an inner right angle recess 28.

Figure 4:
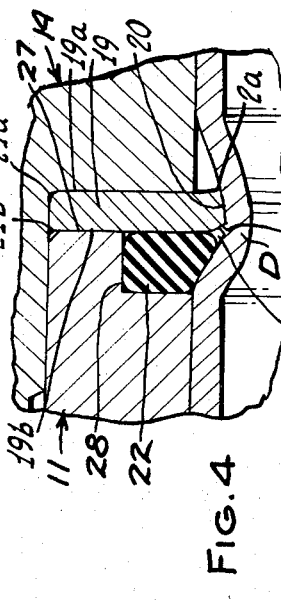
FIG. 4 is a fragmentary sectional view on an enlarged scale portion of the tubing coupling taken at the circled area 4 in FIG. 3.

Upon further rotation of the fitment 14, the surface 27 engages the corner 21b at the periphery of the crimping member 19 forcing the crimping member axially inwardly of the fitment 14. This deformation of the crimping member 19 causes the corner edge 20b to engage the tubing as shown in FIG. 4.

Figure 3:
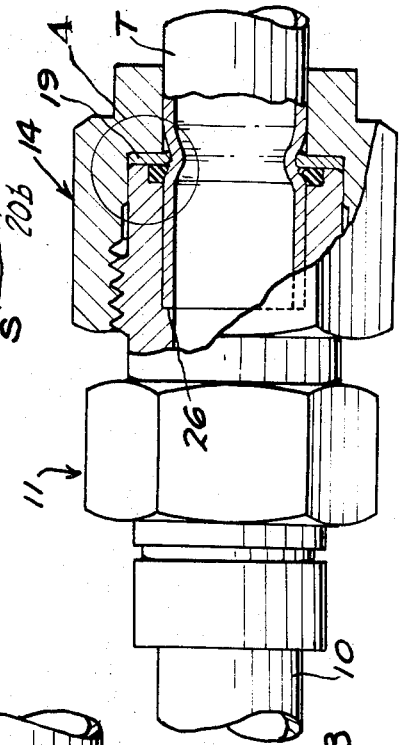
FIG. 3 is a view similar to FIG. 2 showing the relative position of the parts after attachment.

Further rotation of the fitment 14 completely deforms the crimping member to a radial position such as shown in FIG. 3 causing the fitment to be clamped between the surface 27 and the surface 18 thereby limiting the extent of deformation of the crimping member 19.

During the deforming of the crimping member 19, the sealing gland 22 is compressed between the tubing, the recess 28, and the crimping member 19. A portion of the crimping member extends into the space S defined between the corner edge 30 and the deformed portion D of the tubing.

As a result, the coupling provides a high pressure seal which is not subject to blowout. The seal is achieved with minimum coupling torque. The coupling can be readily disconnected and reconnected without disturbing the seal. Since the degree of deformation of the tubing is controlled, the restriction of the flow due to change of cross section of the tubing is also controlled. It has been found that the coupling embodying the invention is both gas and liquid tight at extremely high pressures.

By causing the coupling member 19 to engage the tubing along a substantially annular contact, the tendency of cutting into the tubing is minimized thereby producing minimum material fatigue. It has been found that the coupling is vibration and shakeproof even under extreme conditions and is not affected by temperature variations which might tend to cause nonuniform expansion and contraction with resultant leakage.

I claim:

1. A refrigeration tubing coupling comprising
 a length of soft, permanently deformable metallic refrigeration tubing,
 a first fitting body having an opening therethrough for receiving said tubing,
 said first fitting body having an axial surface and an intersecting radial surface,
 said axial surface of said first fitting body being cylindrical and said radial surface of said first fitting body being at a right angle to the cylindrical surface,
 a second fitting body having an opening therethrough,
 said opening in said second fitting body receiving one end of said tubing extending through said first fitting body,
 said second fitting body having a shoulder intermediate the ends of the opening therethrough which is engaged by the end of said tubing,
 said second fitting body having a first peripheral radial surface on one end thereof adjacent said first fitting body, a second peripheral radial surface spaced inwardly from said first radial surface, and a third peripheral axial surface intersecting said first and second radial surfaces and defining a recess adjacent said tubing,
 a sealing gland of resilient material,
 said sealing gland being positioned in said recess around said tubing and interposed between the first and second fitting bodies,
 an annular generally frusto-conical crimping member of permanently deformable metallic material,
 said crimping member being interposed between said first fitting body and said sealing gland around said tubing,
 said crimping member having spaced annular wall surfaces which are substantially parallel, an outer annular peripheral surface which is flat in a direction axially of the crimping member and is parallel with the longitudinally axis of the tubing and with the cylindrical axial surface of said first fitting body, and is connected to said annular wall surfaces by first and second outer annular corners, and an inner annular peripheral surface which is flat in a direction generally axially of the member, forms an acute angle with the axis thereof, and is connected to said annular wall surfaces by first and second inner annular corners,
 the diameter of the outer annular peripheral surface of said crimping member being substantially equal to the diameter of the cylindrical axial surface of said first fitting body,
 the inner diameter of the crimping member at the first corner adjacent the second fitting body being substantially equal to the outer diameter of the tubing,
 and interengaging means between said fitting bodies for drawing said bodies axially relatively toward one another such that initially the first outer corner of the outer peripheral surface of the crimping member adjacent the second fitting body engages the first surface of the second fitting body and the second inner corner of the crimping member engages the radial surface of the first fitting body and thereafter the crimping body is permanently deformed by pivotal action thereof so that the inner peripheral surface of the crimping member moves radially toward the tubing and axially toward the second fitting body to permanently deform the tubing and to compress the sealing gland against the crimping member, the tubing and the second and third peripheral surface of the second fitting body, the pivot of the crimping member being about said first outer corner and the first surface of the second fitting body and the cylindrical axial surface of the first fitting body whereby in the assembled position a portion of the outer annular peripheral surface of said crimping member adjacent the second corner thereof is spaced from the cylindrical axial surface of the first fitting body,
 said first peripheral surface of said second fitting body abutting the crimping member and clamping the parallel annular wall surfaces of the crimping member against the radial surface of the first fitting body and the radial surface of the second fitting body to limit the axial movement of the fitting bodies relative to one another when said interengaging means is actuated to draw the bodies axially toward one another.

2. The combination set forth in claim 1 wherein said sealing gland comprises an O-ring.

3. A refrigeration tubing coupling comprising
 a first fitting body having an opening therethrough for receiving a length of soft, permanently deformable metallic tubing,
 said first fitting body having an axial surface and an intersecting radial surface,
 said axial surface of said first fitting body being cylindrical and said radial surface of said first fitting body being at a right angle to the cylindrical surface,
 a second fitting body having an opening therethrough, said opening in said second fitting body receiving one end of said tubing extending through said first fitting body, said second fitting body having a shoulder intermediate the ends of the opening therethrough which is engaged by the end of a length of tubing, said second fitting body having a first peripheral radial surface on one end thereof adjacent said first fitting body, a second peripheral radial surface spaced inwardly from said first radial surface, and a third peripheral axial surface intersecting said first and second radial surfaces and defining a recess adjacent said tubing, a sealing gland of resilient material, said sealing gland being adapted to be positioned in said recess around said tubing and interposed between the first and second fitting bodies, an annular generally frusto-conical crimping member of permanently deformable metallic material, said crimping member being adapted to be interposed between said first fitting body and said sealing gland around said tubing, said crimping member having spaced wall surfaces which are substantially parallel, an outer annular peripheral surface which is flat in a direction axially of the crimping member and is parallel with the longitudinal axis of the tubing and with the cylindrical axial surface of said first fitting body, and is connected to said annular wall surfaces by first and second outer annular corners, and an inner annular peripheral surface which is flat in a direction generally axially of the member, forms an acute angle with the axis thereof, and is connected to said annular wall surfaces by first and second inner annular corners, the diameter of the outer annular peripheral surface of said crimping member being substantially equal to the diameter of the cylindrical axial surface of said first fitting body, the inner diameter of the crimping member at the first corner adjacent the second fitting body being substantially equal to the outer diameter of the tubing, and interengaging means between said fitting bodies for drawing said bodies axially relatively toward one another such that initially the first outer corner of the outer peripheral surface of the crimping member adjacent the second fitting body engages the first surface of the second fitting body and the second inner corner of the crimping member engages the radial surface of the first fitting body and thereafter the crimping body is permanently deformed by pivotal action thereof so that the inner peripheral surface of the crimping member moves axially toward and radially toward the tubing and axially toward the second fitting body to permanently deform the tubing and to compress the sealing gland against the crimping member, the tubing and the second and third peripheral surfaces of the second fitting body, the pivot of the crimping member being about said first outer corner and the first surface of the second fitting body and the cylindrical axial surface of the first fitting body whereby in the assembled position a portion of the outer annular peripheral surface of said crimping member adjacent the second corner thereof is spaced from the cylindrical axial surface of the first fitting body, said first peripheral surface of said second fitting body abutting the crimping member and clamping the parallel annular wall surfaces of the crimping member against the radial surface of the first fitting body and the radial surface of the second fitting body to limit the axial movement of the fitting bodies relative to one another when said interengaging means is actuated to draw the bodies axially toward one another.

4. The combination set forth in claim 1 wherein said sealing gland comprises an O-ring.

* * * * *

PO-1050
(5/69)

UNITED STATES PATENT OFFICE
CERTIFICATE OF CORRECTION

Patent No. __3,697,102__ Dated __October 10, 1972__

Inventor(s) __Jay F. Falke__

It is certified that error appears in the above-identified patent and that said Letters Patent are hereby corrected as shown below:

Column 6, line 39, change "claim 1" to "claim 3".

Signed and sealed this 3rd day of April 1973.

(SEAL)
Attest:

EDWARD M. FLETCHER, JR.  ROBERT GOTTSCHALK
Attesting Officer  Commissioner of Patents